(12) United States Patent
Takasu (10) Patent No.: US 9,805,353 B2
(45) Date of Patent: Oct. 31, 2017

(54) POS SYSTEM AND CONTROL METHOD OF A POS SYSTEM

(71) Applicant: Seiko Epson Corporation, Tokyo (JP)

(72) Inventor: Kazuhiro Takasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/658,740

(22) Filed: Mar. 16, 2015

(65) Prior Publication Data

US 2015/0278787 A1 Oct. 1, 2015

(30) Foreign Application Priority Data

Mar. 31, 2014 (JP) .................................. 2014-071133
Apr. 8, 2014 (JP) .................................. 2014-079191

(51) Int. Cl.
| G06Q 20/20 | (2012.01) |
|---|---|
| G07G 1/00 | (2006.01) |
| G07G 1/14 | (2006.01) |
| G07G 5/00 | (2006.01) |

(52) U.S. Cl.
CPC ........... *G06Q 20/20* (2013.01); *G06Q 20/202* (2013.01); *G06Q 20/204* (2013.01); *G06Q 20/206* (2013.01); *G06Q 20/209* (2013.01); *G07G 1/0036* (2013.01); *G07G 1/14* (2013.01); *G07G 5/00* (2013.01)

(58) Field of Classification Search
CPC .... G06C 20/20; G06C 20/209; G06C 20/204; G06C 20/206; G06C 20/202; G07G 1/0036; G07G 1/14; G07G 5/00

See application file for complete search history.

(56) References Cited

U.S. PATENT DOCUMENTS

| 2005/0209963 | A1 | 9/2005 | Momose | |
|---|---|---|---|---|
| 2013/0065648 | A1* | 3/2013 | Kim | ................ G06F 21/31 455/566 |
| 2013/0266141 | A1* | 10/2013 | Kim | ................ H04W 12/02 380/270 |
| 2014/0084049 | A1 | 3/2014 | Shima et al. | |
| 2015/0002896 | A1 | 1/2015 | Takasu et al. | |

FOREIGN PATENT DOCUMENTS

| CN | 101276498 A | 10/2008 | |
|---|---|---|---|
| CN | 102411819 A | 4/2012 | |
| CN | 102760335 A | 10/2012 | |
| EP | 2637146 A2 * | 9/2013 | ............. G06F 3/041 |
| EP | 2680243 A1 | 1/2014 | |
| EP | 2687977 A2 | 1/2014 | |
| JP | 2001-055845 | 2/2001 | |
| JP | 2005-267059 | 9/2005 | |
| JP | 2013-186488 | 9/2013 | |
| JP | 2013-250602 | 12/2013 | |
| JP | 2013-250844 | 12/2013 | |
| JP | 2013-254343 | 12/2013 | |
| WO | 2013132809 A1 | 9/2013 | |

* cited by examiner

*Primary Examiner* — Kristy A Haupt
(74) *Attorney, Agent, or Firm* — Foley & Lardner LLP (57) ABSTRACT

A POS system SY has a card reader 4 that reads data; a printer 2 connected to the card reader 4 and receiving data input from the card reader 4; and a tablet terminal 1 connected to the printer 2. The tablet terminal 1 has a POS application 52 for executing a transaction process, a payment application 53 for executing a payment process based on data input to the printer 2, and a control unit 110 that controls the POS application 52 and payment application 53.

14 Claims, 9 Drawing Sheets

POS SYSTEM AND CONTROL METHOD OF A POS SYSTEM

Priority is claimed under 35 U.S.C. §119 to Japanese Application nos. 2014-071133 filed Mar. 31, 2014 and 2014-079191 filed Apr. 8, 2014 are hereby incorporated by reference in their entirety.

BACKGROUND

1. Technical Field

The present disclosure relates to a POS (point of sale) system using tablet terminals, and to a control method of the POS system.

2. Related Art

There is a great need to use tablet terminals (devices) as POS terminals to take advantage of the portability and operability of tablet devices. Related technology is described in JP-A-2013-186488, for example. JP-A-2013-186488 discloses a POS system that uses tablet terminals functioning as POS terminals, input devices for reading product barcodes and customer member cards, and printers connected to the tablet terminals and input devices. The tablet terminals run a POS application through a web browser.

To add an electronic payment function (such as a credit card payment function or e-money card payment function) to the POS system disclosed in JP-A-2013-186488, an application programming interface (API) for controlling a credit authorization terminal (CAT) and a reader/writer must be incorporated into the POS application. More specifically, the backbone POS application must be significantly modified simply to add an electronic payment function, and the cost of adding such a feature balloons.

Furthermore, when a tablet terminal is used as the POS terminal, directly connecting devices such as a CAT and reader/writer to the tablet terminal may not be possible because of interface issues. Connecting such devices through a USB interface, for example, also requires a wired connection, thus negating the benefit of the tablet's portability.

SUMMARY

The present invention addresses the foregoing problem by providing a POS system and a control method of a POS system that enable introducing an electronic payment function to a POS system at low cost using tablet terminals as POS terminals without defeating the portability and other advantages of tablet terminals.

A POS system according to one aspect of the invention includes: a device that reads data; a control device that connects to the device and inputs the data read by the device; and a terminal that connects to the control device and has a control unit that controls a POS application for processing transactions, and a payment application for processing payments based on the data input to the control device.

A control method of a POS system according to another aspect of the invention includes: executing a transaction process by a POS application on a terminal; switching on the terminal from the POS application to a payment application that executes a payment process; reading data by a device; inputting data read by the device to a control device; executing a payment process by a payment application on the terminal based on data input to the control device and the result of the transaction process by the POS application on the terminal; and ending the transaction process of the POS application based on the payment result of the payment application.

By inserting a control device between a device that reads data and a terminal (tablet terminal), these aspects of the invention enable the terminal to communicate with the device even when they are not directly connected to each other. Furthermore, because the device connects to the control device, the advantages of tablet terminal portability can be used. In addition, because in addition to a POS application the terminal has a payment application for executing a payment process based on data input to the control device, significant modification of the POS application is not required to introduce an electronic payment system. An electronic payment function can therefore be introduced to a POS system at low cost.

Note that a transaction process of a POS application means acquiring product information, calculating the payment amount, handling cash payments, sending electronic payment commands to the payment application, and controlling printing receipts, for example.

The payment process of the payment application includes controlling sending electronic payment information (including data read by the device) to an electronic payment server, and processes based on the result of the electronic payment process from the electronic payment server (including informing the POS application and retry processes).

Preferably, the control device of the POS system has a print unit that prints receipts.

Thus comprised, a printer that prints receipts can be used as the control device. This eliminates the need for space to install a separate control device.

In a POS system according to another aspect of the invention, the control unit of the terminal executes a process of switching between the POS application and the payment application.

Thus comprised, the invention can be deployed even using terminals that are unable to run and display multiple applications simultaneously. More specifically, inexpensive terminals can be used because a powerful processor and operating environment are not required.

In a POS system according to another aspect of the invention, the control unit of the terminal sends a print command generated by the POS application to the control device after completing processing the payment application, and the print unit prints a receipt based on the print command.

Thus comprised, because sending a print command to the control device (issuing a transaction receipt print command) is triggered processing changing from the payment application to the POS application, there is no need for the POS application to monitor the payment application. As a result, the changes to the POS application required to introduce an electronic payment system can be minimized.

In a POS system according to another aspect of the invention, the payment application executes a payment process related to an electronic payment; and the control device has a first communication unit that sends the result of processing the payment application to an electronic payment server, and a second communication unit that sends the process result of the electronic payment server to the payment application.

Because the control device communicates with the electronic payment server in this configuration, there is no need to provide a separate communication device. An electronic payment system can therefore be introduced at a low cost. The control load on the terminal can also be reduced by inputting data and communicating with the electronic payment server through the control device.

In a POS system according to another aspect of the invention, the control unit of the terminal receives a payment completion report from the electronic payment server to the payment application, and ends processing of the payment application.

Thus comprised, transaction receipts can be produced in conjunction with the payment completion report from the electronic payment server without the user (employee) needing to perform any operation.

In a POS system according to another aspect of the invention, the POS system has plural control devices including a first control device that receives and controls operation based on transaction process data processed by the POS application, and a second control device that receives and controls operation based on payment process data output by the payment application; and the device is connected to the second control device.

In a control method of a POS system according to another aspect of the invention, the POS system has a first control device and a second control device connected to the device; and the control method includes sending transaction process data processed by the POS application of the terminal to the first control device; and sending payment process data output by the payment application on the terminal to the second control device.

Thus comprised, because where the data is sent is determined by the application, there is no need for the POS application to specify the address every time it generates a command. As a result, a single terminal can use devices connected to two or more control devices (including the device connected to the second control device) without needing to greatly modify the POS application.

In a POS system according to another aspect of the invention, the first control device has a print unit that prints receipts based on transaction process data received from the terminal.

Thus comprised, a printer that prints receipts can be used as the first control device.

A POS system according to another aspect of the invention also has a payment server that communicates with the second control device; and the second control device has a communication unit that communicates with the payment server, and executes a payment transaction with the payment server based on the payment process data received from the terminal and the data input from the device.

Because the second control device communicates with the electronic payment server in this configuration, there is no need to provide a separate communication device. The control load on the terminal can also be reduced by inputting data and communicating with the electronic payment server through the second control device.

In a POS system according to another aspect of the invention, the data input from the device is credit information or e-money information; and the device has a reading unit for reading the credit information or e-money information.

In a POS system according to another aspect of the invention, the second control device sends the payment process data with the credit information or e-money information to the payment server.

In a POS system according to another aspect of the invention, the communication unit of the second control device receives the result of the payment transaction on the payment server, and sends the received result of the payment transaction to the terminal.

Thus comprised, an electronic payment function (a credit card payment processing function or an e-money payment processing function) can be introduced to a POS system without needing to greatly modify the POS application.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Figure 1:
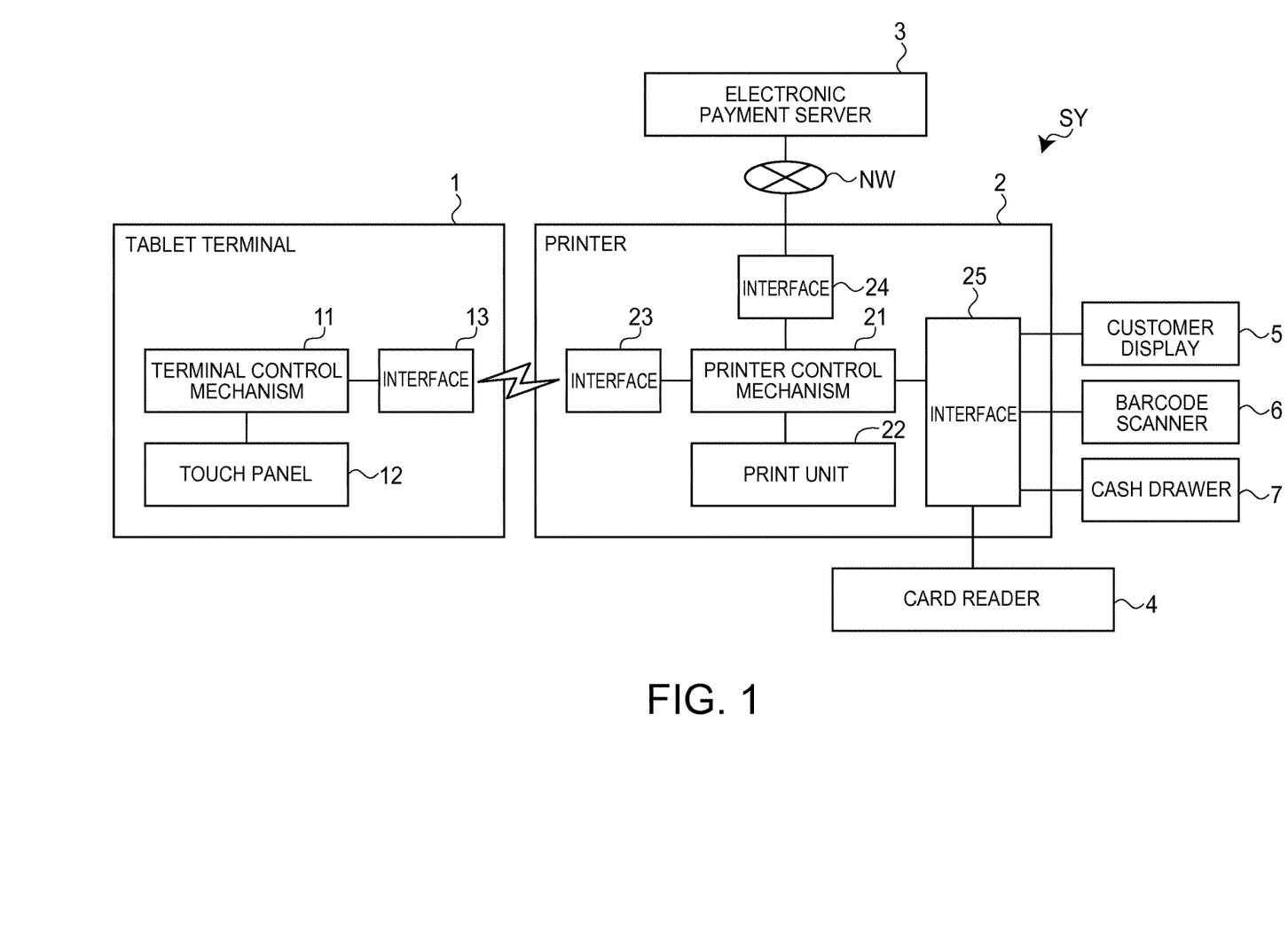
FIG. 1 is a block diagram illustrating the configuration of a POS system according to a first embodiment of the invention.

A POS system and a control method of a POS system according to the first embodiment of the invention are described below with reference to the accompanying figures. FIG. 1 is a block diagram of a POS system SY according to the first embodiment.

This POS system SY includes a tablet terminal 1 (terminal) that is operated by a store employee, a printer 2 (control device) that connects to the tablet terminal 1 through a wireless communication connection, an electronic payment server 3 that connects to the printer 2 through a network NW, and a card reader 4 (device), customer display 5, barcode scanner 6, and cash drawer 7 that connect to the printer 2.

The tablet terminal 1 includes a terminal control mechanism 11, a touch panel 12, and an interface 13. The terminal control mechanism 11 includes a CPU (Central Processing Unit), ROM (Read Only Memory) and RAM (Random Access Memory), and controls the tablet terminal 1.

The touch panel 12 is a touch sensor with a display function, and is used to display information such as the input product information and payment process result, and perform various operations.

The interface 13 is compatible with wireless communication through a wireless LAN, for example, and sends and receives data through an interface 23 of the printer 2. Note that the tablet terminal 1 and printer 2 may be configured to communicate wirelessly through an access point not shown.

The printer 2 has a printer control mechanism 21, print unit 22, and interfaces 23, 24, and 25. The printer control mechanism 21 includes CPU, ROM, RAM, and other peripheral circuits and controls the printer 2. The print unit 22 includes a printhead, paper conveyance mechanism, and paper cutter mechanism, and prints on receipt paper.

The printer 2 communicates wirelessly with the tablet terminal 1 through interface 23, also communicates wirelessly with the electronic payment server 3 over a network NW such as the Internet through interface 24, and communicates by wire or wirelessly through interface 25 with peripheral devices 4, 5, 6, 7.

The electronic payment server 3 processes electronic payments by credit card or e-money, for example.

In the case of payment by credit card, electronic payment includes receiving electronic payment information including the payment amount and the credit information (such as credit card number and expiration date); authenticating the credit card; processing security measures; transferring the payment amount; and reporting the result of the electronic payment.

In the case of e-money, electronic payment includes receiving electronic payment information including the payment amount and the e-money information (such as e-money identification information and balance information); authenticating the e-money; processing security measures; updating the balance information; and reporting the result of the electronic payment.

The card reader 4 reads and outputs data from credit cards and e-money (electronic payment media) to the printer 2. More specifically, the card reader 4 is equivalent to a CAT or reader/writer. Note that e-money is not limited to smartcard media, and an e-money RFID chip embedded in a cell phone, for example, may also be read.

The customer display 5 displays information such as the products and payment amount for the customer. The barcode scanner 6 reads product barcodes printed on or affixed to the products. The cash drawer 7 stores money and checks, for example, and is configured to open when the payment process is completed (when a cash payment is received).

Figure 2:
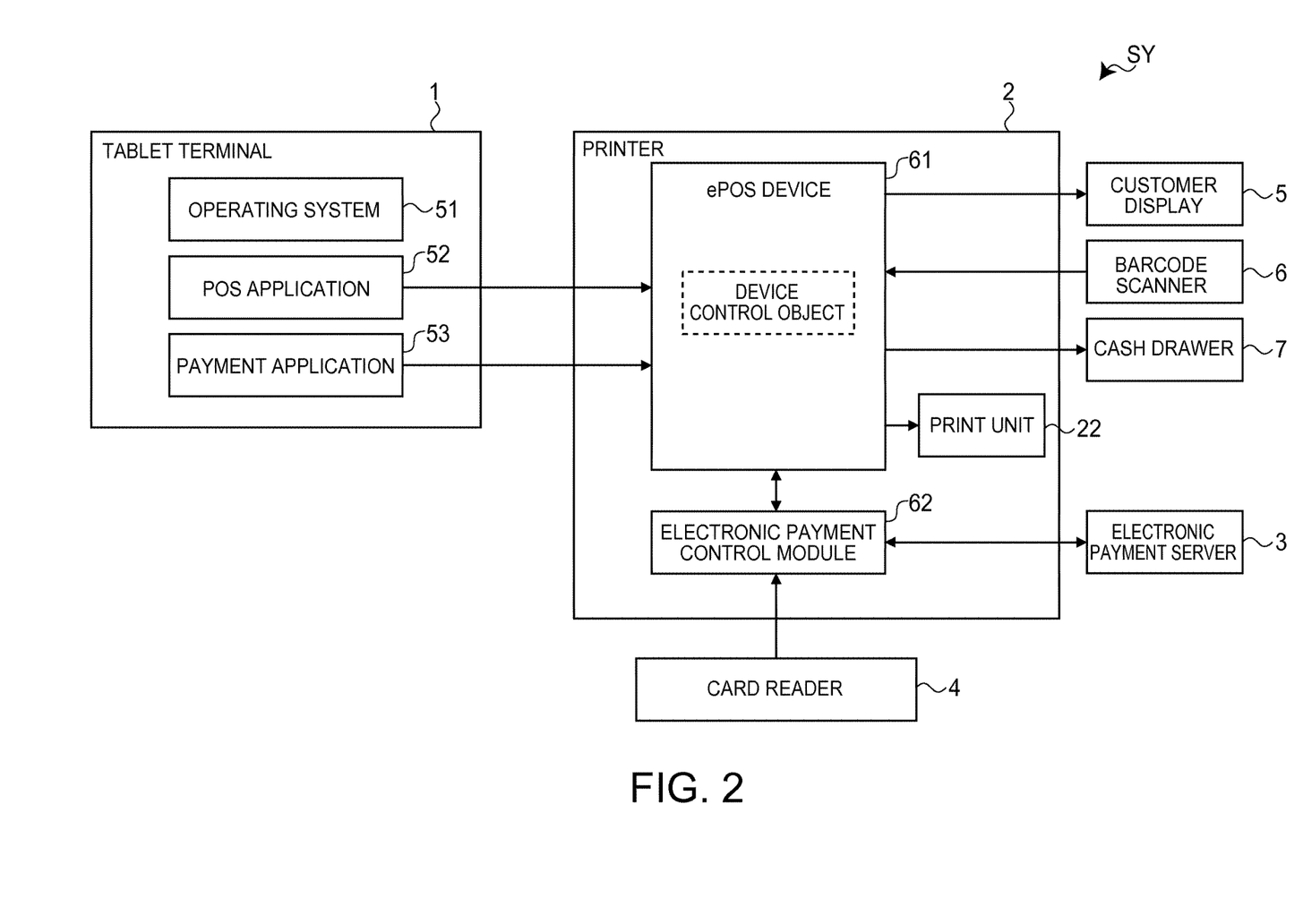
FIG. 2 is a block diagram illustrating the software configuration of a POS system according to the first embodiment of the invention.

The software configuration of the POS system SY is described next with reference to FIG. 2. An operating system 51, and a POS application 52 and a payment application 53 that run on the operating system 51, are installed as software to the tablet terminal 1. The terminal control mechanism 11 in FIG. 1 operates according to these software objects 51, 52, 53.

The POS application 52 is an application that runs a transaction process. A transaction process as used here means acquiring product information (such as product barcodes and quantities), calculating the payment amount, handling cash payments, sending electronic payment commands to the payment application 53, and controlling printing receipts, for example. The POS application 52 may be customized by the store. Such customization may include, for example, the display format of information screens presented on the tablet terminal 1, the printing format of transaction receipts, the store logo printed on transaction receipts, and the display items presented on the customer display 5.

The payment application 53 is an application that executes a payment process using electronic payment media. The payment process includes controlling sending electronic payment information to the electronic payment server 3, and processes based on the result of the electronic payment process from the electronic payment server 3 (including informing the POS application 52 and retry processes). The payment application 53 is not customized for each store, and may be used generically.

The printer 2 has an embedded ePOS device 61 (device control unit) and electronic payment control module 62. The printer control mechanism 21 in FIG. 1 operates based on the ePOS device 61 and electronic payment control module 62.

Based on commands from the POS application 52 and payment application 53, the ePOS device 61 instantiates device control objects for and controls the peripheral devices 4, 5, 6, 7 and print unit 22. For example, the ePOS device 61 controls displaying product names on the customer display 5 based on display commands from the POS application 52, controls sending the results of reading by the barcode scanner 6 to the operating system 51, controls opening the drawer of the cash drawer 7 based on an open drawer command from the POS application 52, and controls operating the print unit 22 based on a print command from the POS application 52. In addition, when a start payment process command is received from the payment application 53, the ePOS device 61 sends the command to the electronic payment control module 62.

The electronic payment control module 62 is an embedded module for controlling the card reader 4. For example, when a start payment process command is passed from the ePOS device 61, the electronic payment control module 62 enables reading by the card reader 4 and waits for data from the card reader 4. The electronic payment control module 62 is also compatible with different brands of multiple electronic payment media.

The electronic payment control module 62 also controls communicating with the electronic payment server 3. More specifically, the electronic payment control module 62 sends electronic payment information including the data captured by the card reader 4 and the payment amount received from the payment application 53 to the electronic payment server 3. When the electronic payment server 3 then successfully completes the payment, the electronic payment control module 62 may control turning an LED (not shown in the figure) on the card reader 4 on to signal that the card may be removed, and sending a payment completion report through the ePOS device 61 to the payment application 53. When the electronic payment server 3 is unable to successfully complete the payment, the electronic payment control module 62 may control blinking an LED on the card reader 4, or control the payment application 53 to display an error (on the touch panel 12) through the ePOS device 61. By thus embedding an electronic payment control module 62, an electronic payment service may be added or changed by simply changing the electronic payment control module 62 (without needing to replace the printer 2 itself).

Figure 3:
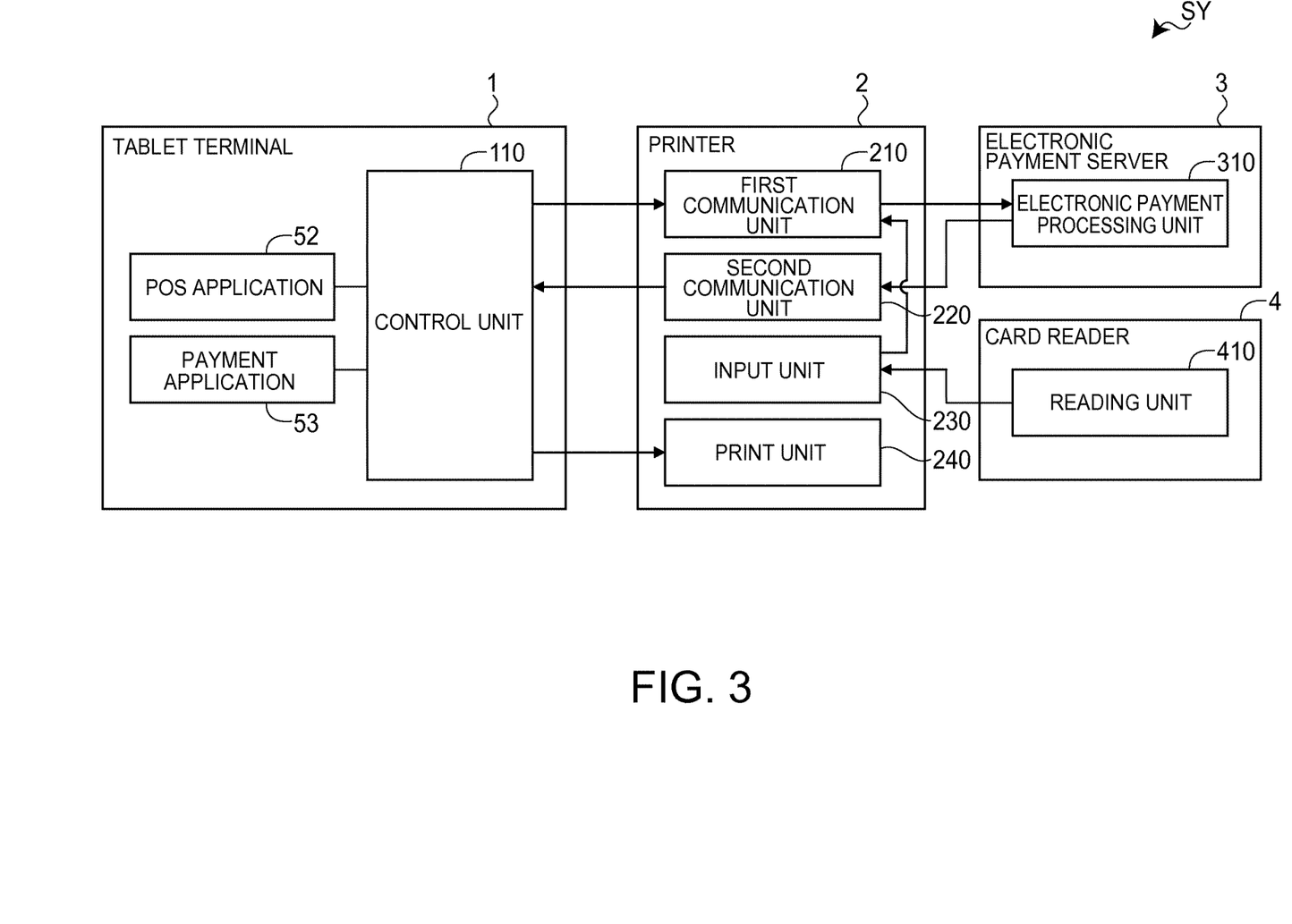
FIG. 3 is a block diagram illustrating the functional configuration of a POS system according to the first embodiment of the invention.

The functional configuration of the POS system SY is described next with reference to FIG. 3. A functional component of the tablet terminal 1 is the control unit 110. The control unit 110 controls the POS application 52 and payment application 53, and controls the input and output of information with units 210, 220, and 240 of the printer 2. The control unit 110 also receives the payment completion report from the electronic payment server 3 to the payment application 53, and ends processing by the payment application 53 (quits or sets the payment application 53 to a sleep mode).

When processing the payment application 53 ends, the control unit 110 also starts the POS application 52, and sends a print command to print a transaction receipt to the printer 2. Based on the payment result of the payment application 53, the control unit 110 ends the transaction process of the POS application 52. The control unit 110 thus switches processing between the POS application 52 and payment application 53 so that the applications can be run easily using a low power CPU.

Functional components of the printer 2 include a first communication unit 210, a second communication unit 220, a input unit 230, and a print unit 240. The first communication unit 210 sends the process result of the payment application 53 and the input result of the input unit 230 to the electronic payment server 3. The second communication unit 220 sends the process result from the electronic payment server 3 to the payment application 53. The input unit 230 inputs the data read by the card reader 4. The print unit 240 prints based on the print commands generated by the POS application 52.

The electronic payment server 3 has an electronic payment processing unit 310 as a functional component. The electronic payment processing unit 310 executes the electronic payment process described above. The card reader 4 has a reading unit 410 as a functional component. The reading unit 410 reads data from electronic payment media by means of a magnetic reader or near-field communication, for example.

Figure 4:
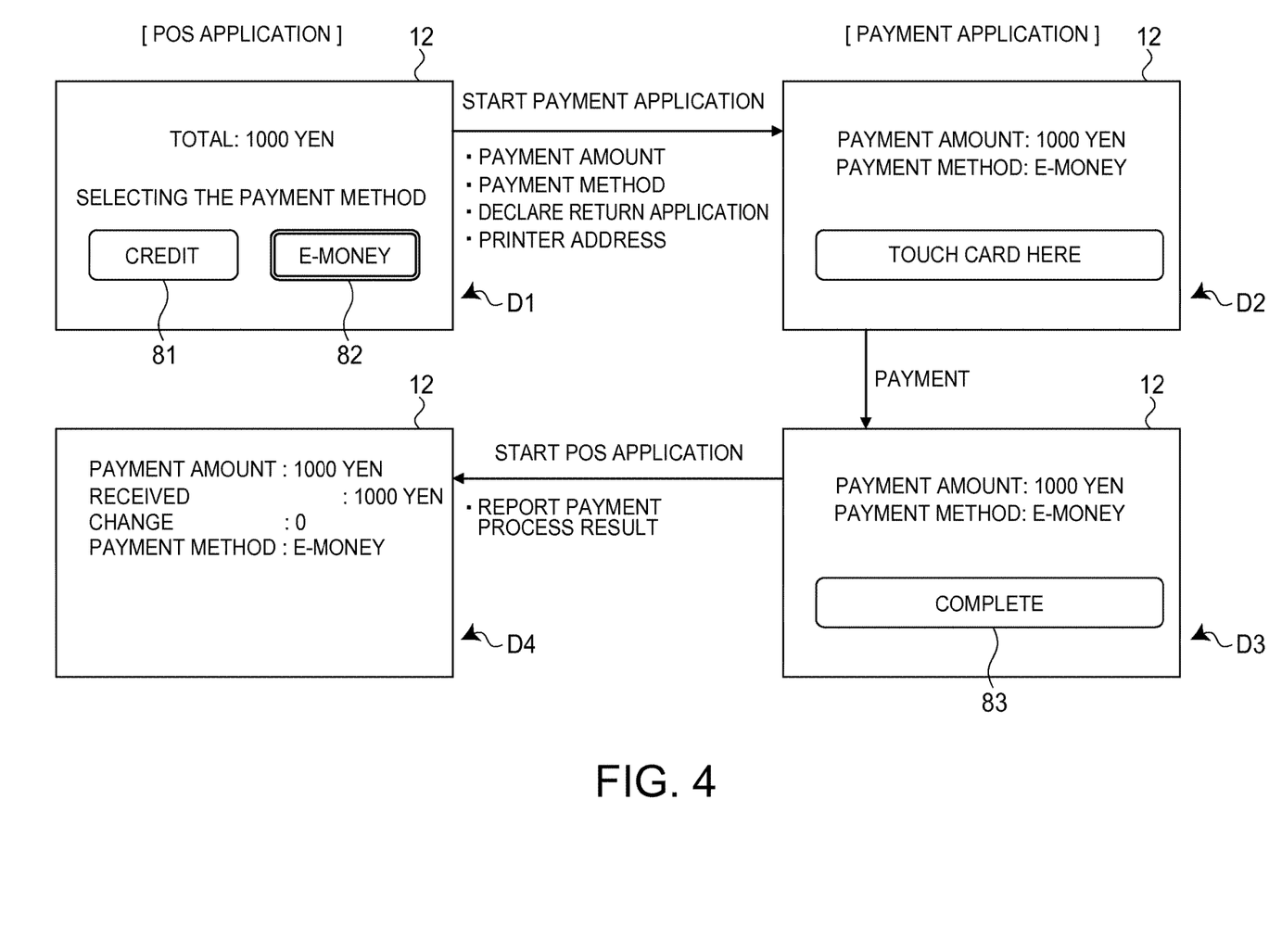
FIG. 4 shows an example of the display transition of the tablet terminal.

Screens that are displayed on the touch panel 12 of the tablet terminal 1 are described next with reference to FIG. 4. In FIG. 4, reference numerals D1 and D4 illustrate display screens presented by the POS application 52, and reference numerals D2 and D3 illustrate display screens presented by the payment application 53. The screen transition of the touch panel 12 is described next following the flow of a transaction process.

As shown by reference numeral D1, the POS application 52 first displays a screen for selecting the payment method upon completion of inputting the product information to the tablet terminal 1. In the event of a cash payment, the POS application 52 completes the transaction process without starting the payment application 53 in response to a specific operation (such as opening the cash drawer) by the checkout clerk. If the Credit button 81 or the E-money button 82 is tapped to select the corresponding payment method, the POS application 52 starts the payment application 53 and then enters a standby mode. In this example, the E-money button 82 is selected from the screen shown in reference numeral D1. Note that the payment application 53 is started by specifying a predetermined address.

When starting the payment application 53, the POS application 52 also sends information including the payment amount, payment method, the application to return to (POS application 52), and the address of the printer 2 to the payment application 53, and enters the standby mode after this transmission.

Next, the payment application 53 displays a screen as shown in reference numeral D2 based on the information received from the POS application 52. If the customer touches an e-money chip past the card reader 4, the payment application 53 processes the payment (communicates with the electronic payment server 3), and displays a screen as shown in reference numeral D3. A display presented when the payment process is successful is shown in this example.

When the Complete button 83 is touched in the screen shown in reference numeral D3, the payment application 53 specifies the address of the POS application 52, and starts the POS application 52. At the same time, the payment application 53 sends the payment process result to the POS application 52, and then either quits or goes to a standby mode.

Based on the payment process result received from the payment application 53, the POS application 52 displays the screen shown in reference numeral D4. While not specifically shown in the figure, also sends a print command to print a transaction receipt to the printer 2 when presenting this screen.

Note that FIG. 4 shows examples of screens presented on the tablet terminal 1, but the same screens may be displayed on the customer display 5. In this event, the customer may select and touch the buttons 81, 82, 83.

Figure 5:
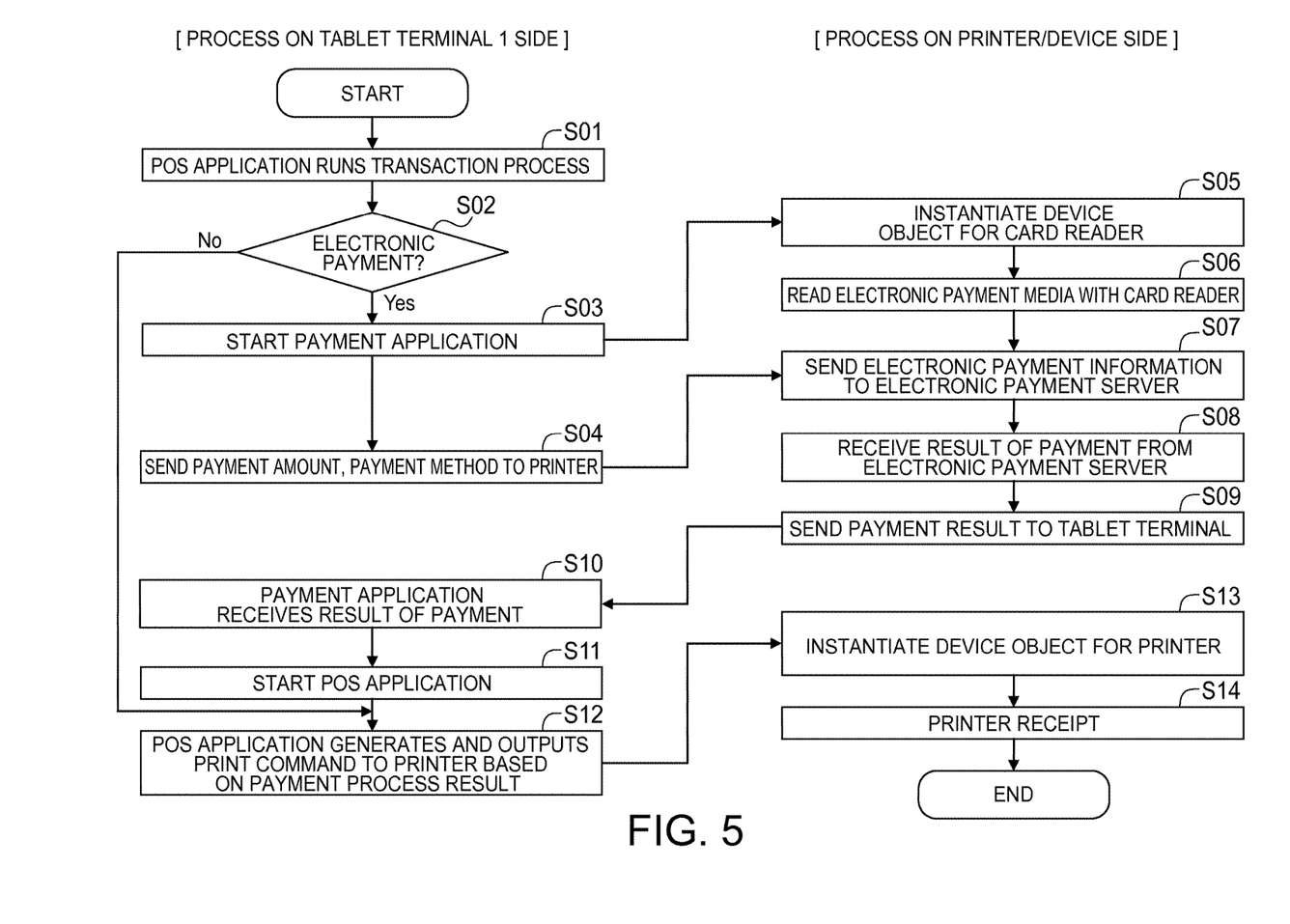
FIG. 5 is a flow chart showing the flow of a transaction process in the first embodiment of the invention.

Referring to the flow chart in FIG. 5, the flow of the transaction process executed by the POS system SY is described next.

When the transaction process is run by the POS application 52 (S01), the tablet terminal 1 determines if the payment method is an electronic payment (credit or e-money) (S02). If the payment method is not by electronic payment (such as when payment is by cash) (S02 returns NO), steps S03 to S11 are skipped and control goes to step S12. If electronic payment is selected (S02 returns YES), the payment application 53 starts (S03), and information indicating the payment amount and payment method is sent from the payment application 53 to the printer 2 (S04).

When the payment application 53 is started by the tablet terminal 1, the printer 2 instantiates a device object for the card reader 4 by the ePOS device 61 (S05). Note that the printer 2 may instantiate the device object by monitoring the current application and detecting when the payment application 53 starts, or the payment application 53 may be configured to automatically send a status signal reporting when the payment application 53 starts to the printer 2.

When a device object for the card reader 4 is instantiated by the printer 2, the card reader 4 can be used and electronic payment media can be read (S06). The printer 2 then sends electronic payment information including the result of reading the electronic payment media and the payment amount to the electronic payment server 3 appropriate to the payment method (S07), and then receives the result of the electronic payment (payment approved or payment rejected) from the electronic payment server 3 (S08). The printer 2 also sends the result of the electronic payment that was received to the tablet terminal 1 (S09).

Because the payment application 53 is running on the tablet terminal 1, the payment application 53 receives the result of the electronic payment that was sent in S09 (S10). Next, the payment application 53 starts the POS application 52, and sends the payment process result based on the result of the electronic payment received from the electronic payment server 3 to the POS application 52 (S11). The POS application 52 then generates and sends a print command based on the received payment process result to the printer 2 (S12). When this print command is received, the printer 2 instantiates a device object for the print unit 22 by means of the ePOS device 61 (S13), and prints a transaction receipt (S14).

As described above, this embodiment of the invention is a configuration having a printer 2 interceding between a tablet terminal 1 and a card reader 4 that reads data from electronic payment media, and can communicate even when the tablet terminal 1 is not directly connected to the card reader 4. The tablet terminal 1 and printer 2 are also connected wirelessly, thereby not defeating the portability of the tablet terminal 1.

In addition to the POS application 52, a payment application 53 used for electronic payments is installed to the tablet terminal 1. Great modification of the POS application 52 is therefore not necessary to deploy an electronic payment function, and the cost of deployment can therefore be kept down. In this embodiment of the invention, modification of the POS application 52 is limited to adding a Credit button 81 and an E-money button 82 to the payment screen (see FIG. 4), and adding a function for starting the payment application 53 when one of these buttons is operated.

Furthermore, because an electronic payment server 3, card reader 4, and other peripheral devices 5, 6, 7 are connected to the printer 2, and the printer 2 processes data input and output, the control load on the tablet terminal 1 can be reduced. Because the tablet terminal 1 also executes a process that switches between the POS application 52 and payment application 53, even terminals that are unable to run plural applications simultaneously can be used as the tablet terminal 1 in this embodiment of the invention.

Yet further, because sending a print command to the printer 2 is triggered by the payment completion report sent from the electronic payment server 3 to the payment application 53, a transaction receipt can be printed without the operator needing to press a button, for example.

Note that the control device of the invention is embodied by the printer 2 in this example, but the control device may also be embodied by a control device that can connect to the printer 2 or by an interface board that is removably installable to the printer 2. In this case, the printer control mechanism 21 and interfaces 23, 24, 25 shown in FIG. 1, the ePOS device 61 and electronic payment control module 62 shown in FIG. 2, and the first communication unit 210, second communication unit 220, and input unit 230 shown in FIG. 3 are disposed to the control device or to the interface board.

The tablet terminal 1 is controlled using a native application in the foregoing embodiment, but may alternatively be controlled by a web application. In this event, the POS application 52 and payment application 53 are run by the server over the Internet, and the operating system 51 is not necessary.

Further alternatively in this embodiment, the print command may be generated and sent to the printer 2 by the POS application 52, but the print command may be generated and sent to the printer 2 by the payment application 53. Further alternatively, the payment application 53 may acquire a print command generated by the POS application 52, and the payment application 53 may send the acquired command to the printer 2.

Embodiment 2

A second embodiment of the invention is described next with reference to FIG. 6 to FIG. 9. This embodiment is directed to enabling a single tablet terminal 1 to use devices connected to different printers 2 without needing to greatly modify the POS application 52. Only the differences between this and the first embodiment are described below. Note, further, that like parts in this and the first embodiment are identified by like reference numerals, and further detailed description thereof is omitted. Modifications applicable to like parts in the first embodiment are also applicable to this embodiment.

Figure 6:
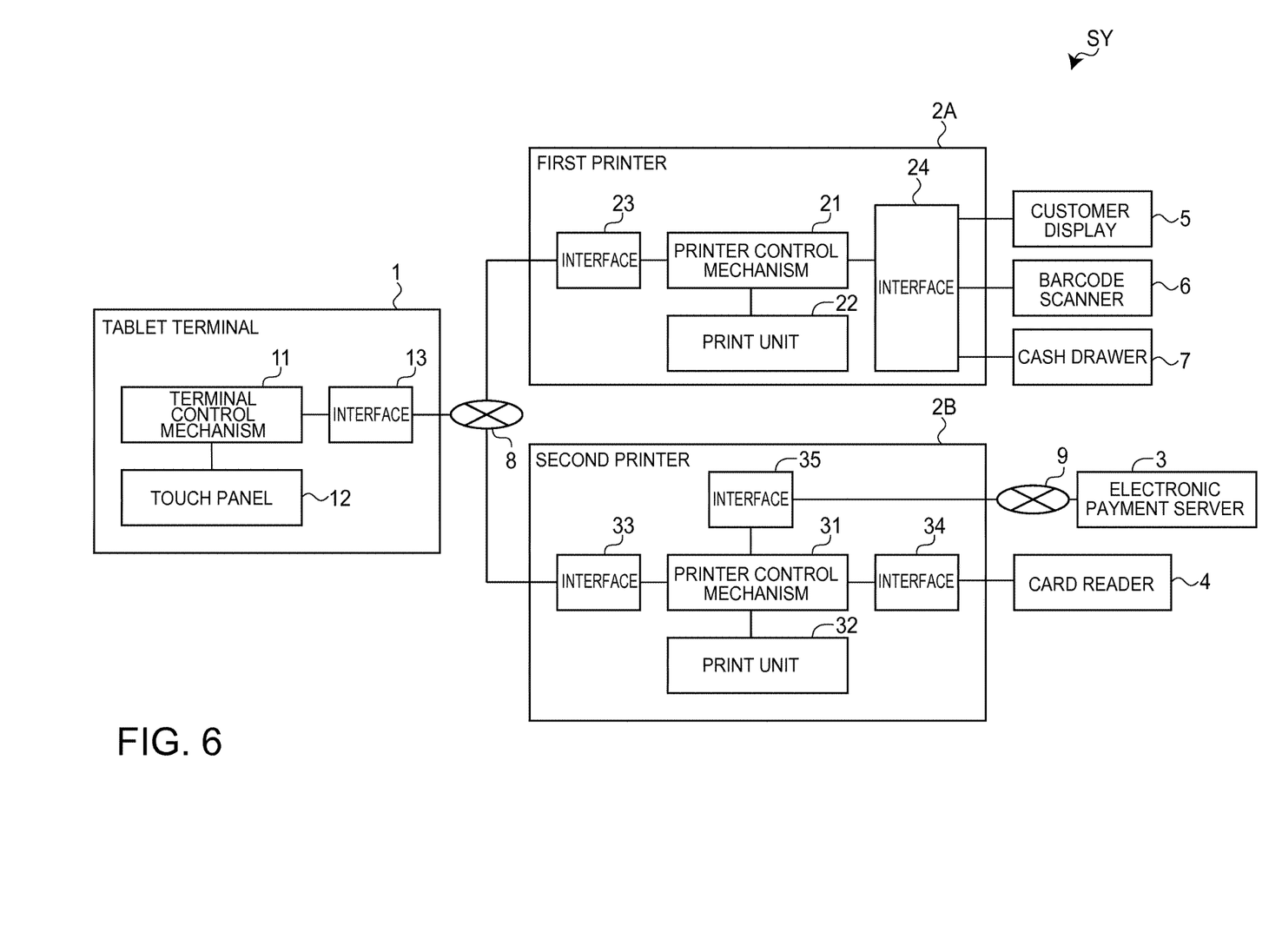
FIG. 6 is a block diagram illustrating the configuration of a POS system according to a second embodiment of the invention.

FIG. 6 is a block diagram of a POS system SY according to the second embodiment of the invention. The POS system SY in this embodiment has a tablet terminal 1 (terminal), a first printer 2A (first control device) and a second printer 2B (second control device) connected through a store LAN 8 to the tablet terminal 1, and an electronic payment server 3 (payment server) connected through the Internet 9 to the second printer 2B. The POS system SY also a customer display 5, barcode scanner 6, and cash drawer 7 connected to the first printer 2A, and a card reader 4 (device) connected to the second printer 2B.

The interface 13 of the tablet terminal 1 is compatible with wireless communication through a wireless LAN, for example, is connected to the store LAN 8 through an access point not shown, and sends and receives data with the interfaces 23, 33 of the printers 2A, 2B through the store LAN 8.

In addition to a printer control mechanism 21 and print unit 22, the first printer 2A also has interfaces 23 and 24. The one interface 23 communicates with the tablet terminal 1 through the store LAN 8. The other interface 24 communicates by wire or wirelessly with the peripheral devices 5, 6, 7. The print unit 22 includes a printhead, paper conveyance mechanism, and paper cutter mechanism, and prints on receipt paper.

In addition to a printer control mechanism 31 and print unit 32, the second printer 2B also has interfaces 33 and 34. The printer control mechanism 31 includes CPU, ROM, RAM, and other peripheral circuits and controls the second printer 2B. The print unit 32 includes a printhead, paper conveyance mechanism, and paper cutter mechanism, and prints on receipt paper.

The one interface 33 communicates through the store LAN 8 with the tablet terminal 1. The other interface 34 communicates by wire or wirelessly with the card reader 4. A third interface 35 communicates through the Internet 9 with the electronic payment server 3.

Figure 7:
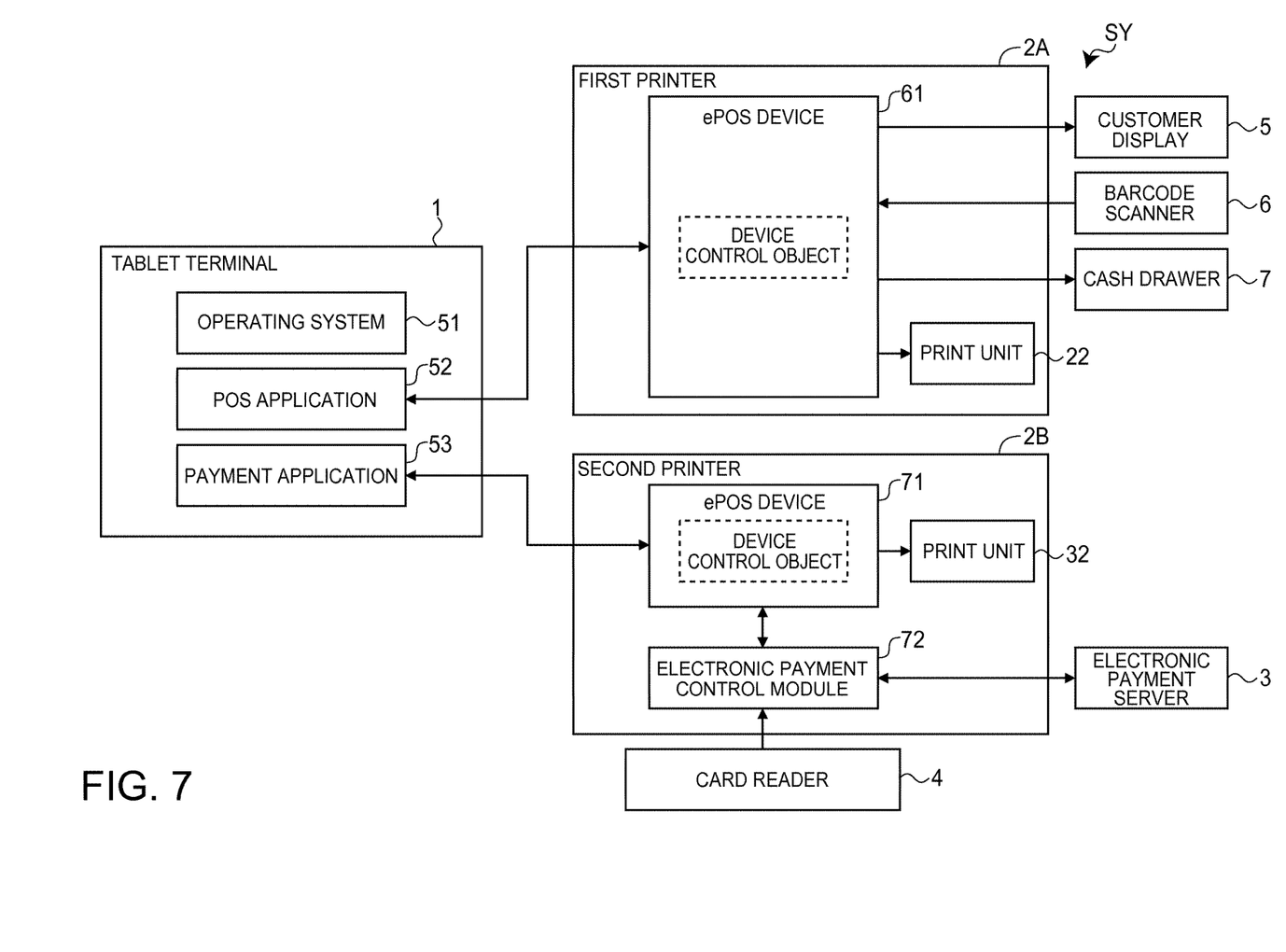
FIG. 7 is a block diagram illustrating the software configuration of a POS system according to the second embodiment of the invention.

The software configuration of the POS system SY is described next with reference to FIG. 7. The software configuration of the tablet terminal 1 is the same as in the first embodiment. An ePOS device 61 is embedded in the first printer 2A. The printer control mechanism 21 shown in FIG. 6 operates primarily based on the ePOS device 61.

The second printer 2B has an embedded ePOS device 71 and electronic payment control module 72. The printer control mechanism 31 in FIG. 6 operates based on the ePOS device 71 and electronic payment control module 72.

Based on commands from the tablet terminal 1, the ePOS device 71 instantiates device control objects for and controls the card reader 4 and print unit 32. When a start payment process command is received from the payment application 53, the ePOS device 71 sends the command to the electronic payment control module 72.

The electronic payment control module 72 is an embedded module for controlling the card reader 4. The electronic payment control module 72 also communicates with the electronic payment server 3.

Figure 8:
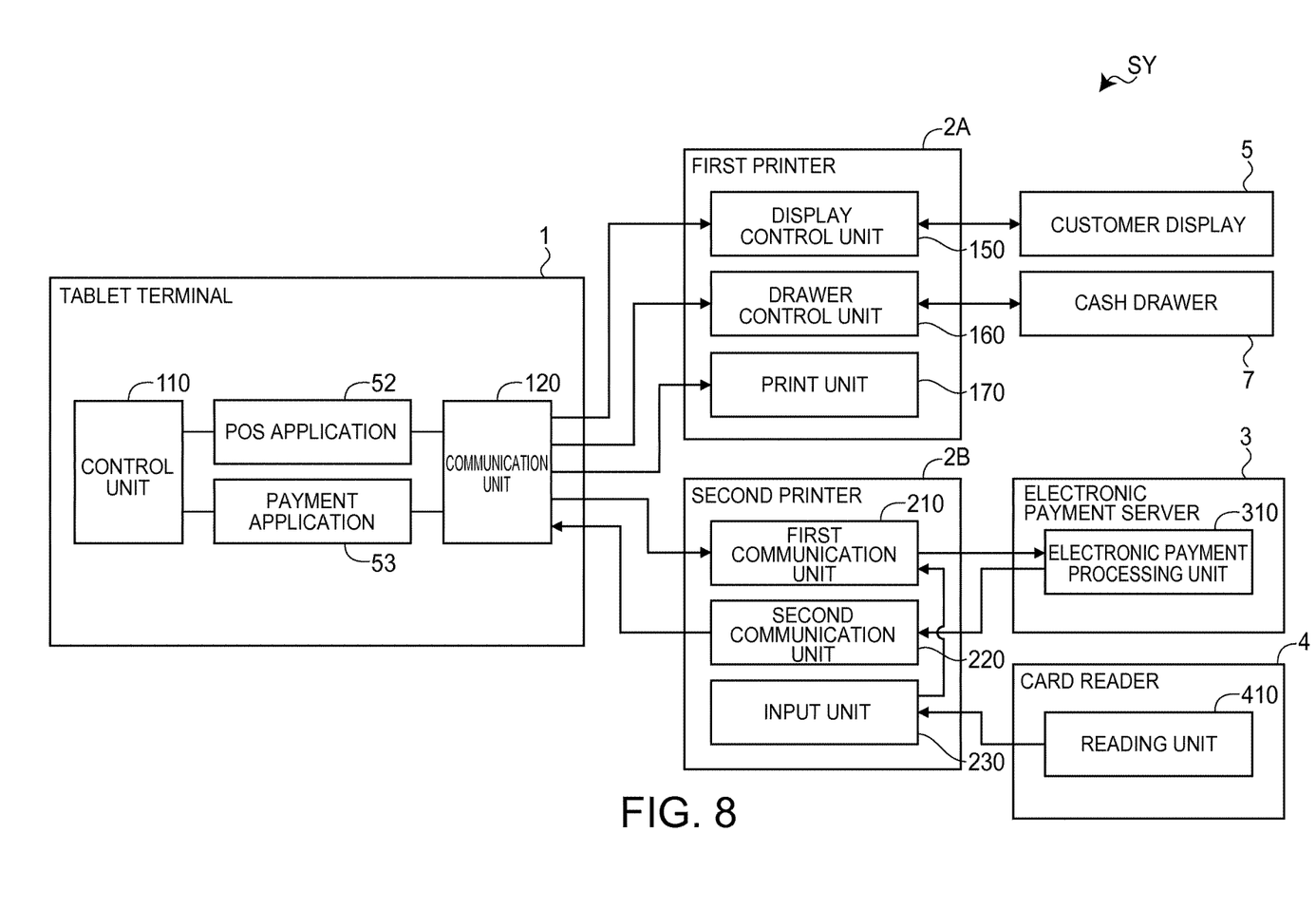
FIG. 8 is a block diagram illustrating the functional configuration of a POS system according to the second embodiment of the invention.

The functional configuration of the POS system SY is described next with reference to FIG. 8. Functional components of the tablet terminal 1 include the control unit 110 and communication unit 120. The communication unit 120 sends data processed by the POS application 52 to the first printer 2A, and sends data output from the payment application 53 to the second printer 2B. More specifically, the communication unit 120 sends print commands for printing transaction receipts, display commands for displaying the payment process results, and open drawer commands for opening the cash drawer 7 that are generated by the POS application 52 to the first printer 2A. The transaction amount (transaction process data) is contained in the print commands and display commands.

The payment application 53 generates electronic payment information transmission commands for sending electronic payment information to the electronic payment server 3, and the communication unit 120 sends the commands to the second printer 2B. The payment amount (payment process data) and payment method are included in the electronic payment information transmission command.

Functional components of the first printer 2A include a display control unit 150, drawer control unit 160, and print unit 170. The display control unit 150 controls the customer display 5 and displays information on the customer display 5 based on display commands generated by the POS application 52.

The drawer control unit 160 controls the cash drawer 7 and causes the cash drawer 7 to open based on an open command generated by the POS application 52.

The print unit 170 prints based on print commands generated by the POS application 52.

Functional components of the second printer 2B includes a first communication unit (communication unit) 210, a second communication unit 220, and an input unit 230. The first communication unit 210 sends the payment amount and the input result of the input unit 230 contained in the electronic payment information transmission command generated by the payment application 53 to the electronic payment server 3. The second printer 2B thus executes a payment transaction with the electronic payment server 3. The second communication unit 220 then sends the process result (the result of the payment transaction) from the electronic payment server 3 to the payment application 53. The input unit 230 inputs data read by the card reader 4.

The electronic payment server 3 has an electronic payment processing unit 310 as a functional component. The electronic payment processing unit 310 executes the electronic payment process described above.

The card reader 4 has a reading unit 410 as a functional component. The reading unit 410 reads credit information from credit cards and e-money information from e-money media.

Figure 9:
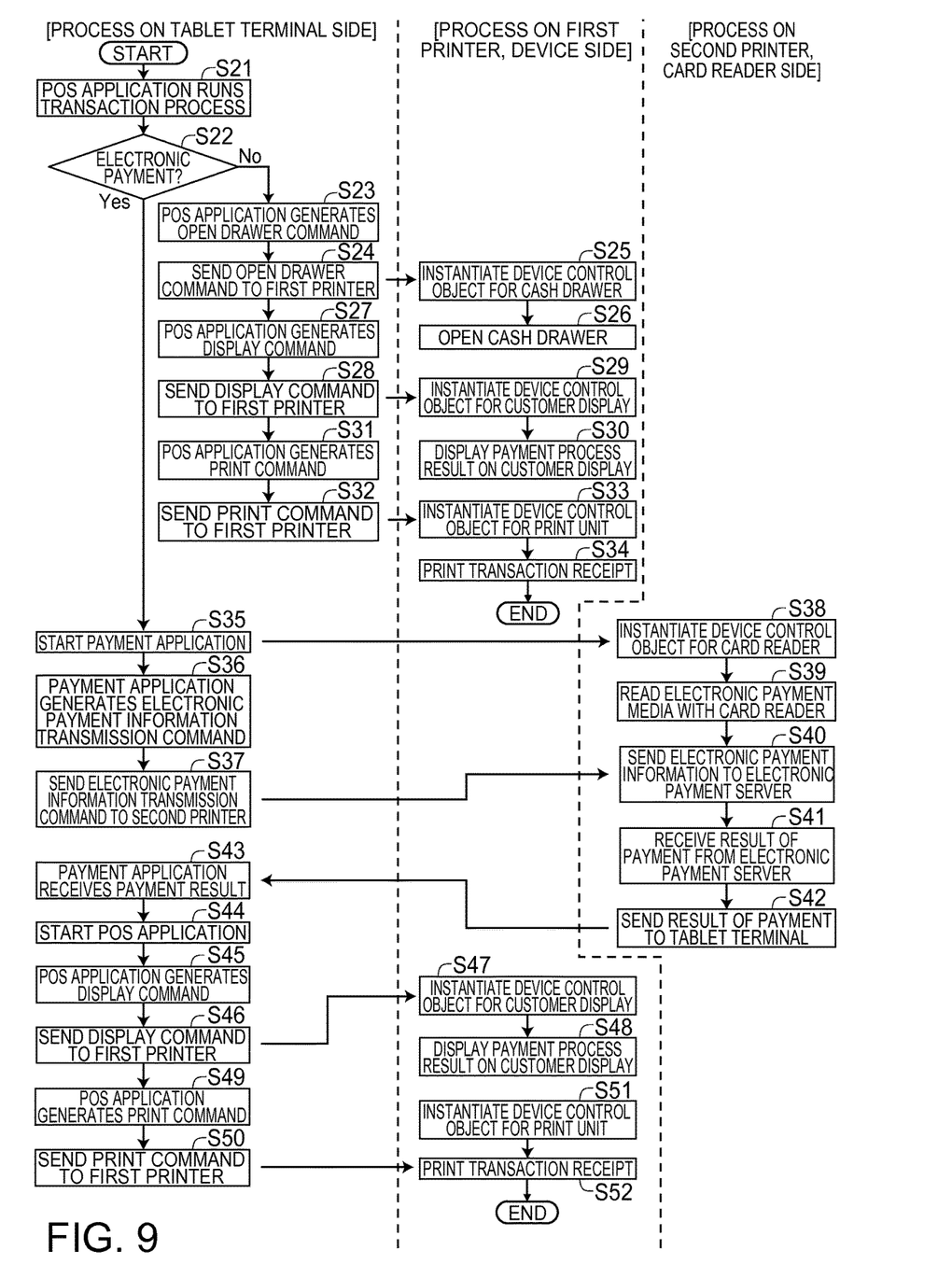
FIG. 9 is a flow chart showing the flow of a transaction process in the second embodiment of the invention.

The flow of a transaction process in this POS system SY is described next with reference to the flow chart in FIG. 9.

When the tablet terminal 1 executes the transaction process by the POS application 52 (S21), it first determines if the payment method is an electronic payment (credit or e-money) (S22).

If the payment method is not an electronic payment (such as when payment is by cash) (S22 returns NO), the POS application 52 generates an open drawer command for the cash drawer 7 (S23), and sends the open drawer command to the first printer 2A (S24). When the open drawer command is received, the first printer 2A instantiates a device control object for the cash drawer 7 by the ePOS device 61 (S25), and opens the cash drawer 7 (S26). A cash payment then completed.

Next, the POS application 52 generates a display command based on the result of the cash payment process (S27), and sends the generated display command to the first printer 2A (S28). When the display command is received, the first printer 2A instantiates a device control object for the customer display 5 by the ePOS device 61 (S29), and displays the payment process result on the customer display 5 (S30).

Next, the POS application 52 generates a print command based on the result of the cash payment process (S31), and sends the generated print command to the first printer 2A (S32). When the print command is received, the first printer 2A instantiates a device control object for the print unit 22 by the ePOS device 61 (S33), and prints a receipt (S34). This completes the transaction process.

When the tablet terminal 1 determines the payment method is an electronic payment (S22 returns YES), it starts the payment application 53 (S35). Next, the payment application 53 generates an electronic payment information transmission command including the payment amount and payment method (S36), and sends the generated electronic payment information transmission command to the second printer 2B (S37).

When the tablet terminal 1 starts the payment application 53, the second printer 2B instantiates a device control object for the card reader 4 by the ePOS device 71 (S38). Note that the second printer 2B may monitor the current application running on the tablet terminal 1 and instantiate the device control object when it detects the payment application 53 started, or the payment application 53 may be configured to automatically send a status signal reporting when the payment application 53 starts to the second printer 2B.

When a device control object for the card reader 4 is instantiated by the second printer 2B, the card reader 4 can be used and electronic payment media can be read (S39). When the electronic payment information transmission command is received, the second printer 2B sends the electronic payment information including the result of reading the electronic payment media and the payment amount to the electronic payment server 3 appropriate to the payment method (S40), and then receives the result of the electronic payment (payment approved or payment rejected) from the electronic payment server 3 (S41). The second printer 2B also sends the result of the electronic payment that was received to the tablet terminal 1 (S42).

Because the payment application 53 is running on the tablet terminal 1, the payment application 53 receives the result of the electronic payment that was sent in S42 (S43). Next, the payment application 53 starts the POS application 52, and sends the payment process result based on the result of the electronic payment received from the electronic payment server 3 to the POS application 52 (S44). The POS application 52 then generates (S45) and outputs (S46) a display command based on the received payment process result to the first printer 2A. When this command is received, the first printer 2A instantiates a device control object for the customer display 5 by the ePOS device 61 (S47), and displays the payment process result on the customer display 5 (S48).

The POS application 52 then generates (S49) and sends (S50) a print command based on the received payment process result to the first printer 2A. When this print command is received, the first printer 2A instantiates a device control object for the print unit 22 by means of the ePOS device 61 (S51), and prints a transaction receipt (S52). This completes the transaction process.

As described above, because the destination of the data is determined by the application in this embodiment of the invention, there is no need for the POS application 52 to specify the address every time a command is generated. As a result, a single tablet terminal 1 can use devices connected to two or more printers 2A, 2B (including the card reader 4 connected to the second printer 2B).

Furthermore, when plural tablet terminals 1 are used, the electronic payment function of the second printer 2B can be used by the plural tablet terminals 1. The invention can therefore be desirably deployed in systems that do not use the electronic payment function frequently and the electronic payment function is deployed in only one of plural printers.

There is also no need to provide a separate communication device because the second printer 2B communicates with the electronic payment server 3. The control load on the tablet terminal 1 side can also be reduced because the second printer 2B handles data input and communication with the electronic payment server 3.

Note that configurations enabling the user to set the destination (printer 2A or 2B) of data processed by the POS application 52 and the destination (printer 2A or 2B) of data output from the payment application 53 on the tablet terminal 1 are also conceivable. Configurations in which the tablet terminal 1 gets information of the peripherals (devices) connected to the printers 2A, 2B, and sets the data destinations accordingly, are also conceivable.

Note that the control device of the invention is embodied by the printers 2A, 2B in this example, but the control device may also be embodied by a relay device that can connect to the printers 2A, 2B or by an interface board that is removably installable to the printers 2A, 2B. In this case, the printer control mechanisms 21, 31 and interfaces 23, 24, 33, 34, 35 shown in FIG. 6, the ePOS devices 61, 71 and electronic payment control module 72 shown in FIG. 7, and the display control unit 150, drawer control unit 160, first communication unit 210, second communication unit 220, and input unit 230 shown in FIG. 8 are disposed to the relay device or to the interface board.

Components of the POS systems SY described in the foregoing embodiments and variations thereof can also be embodied as software programs. The programs can also be stored and provided on recording media such as CD-ROM or flash memory media. More specifically, programs and recording media storing programs that cause a computer to function as elements of the POS system SY are also included in the scope of the present invention.

A tablet terminal 1 is used as an example of a terminal according to the invention in the foregoing embodiments, but other types of information processing devices may be used instead. A printer 2 is also used as an example of a control device according to the invention, but the invention can obviously be applied to POS peripherals other than a printer 2, such as the customer display 5. Other modifications and adaptations that do not depart from the technical scope of the invention will also be apparent to one skilled in the related art.

What is claimed is:

1. A POS system comprising:
a device configured to read data from electronic payment media;
a control device that connects to the device and is configured to receive the data and inputted by the device;
an electronic payment server that connects to the control device through a network: and
a terminal that connects to the control device and connects to the electronic payment server via the control device, the terminal including a payment application for processing electronic payments based on data input from the control device and a controller that controls the payment application,
wherein the control device sends electronic payment information generated by the payment application and the data input from the device to the electronic payment server and sends a payment result acquired from the electronic payment server to the terminal.

2. The POS system described in claim 1, wherein:
the control device has a print mechanism that prints receipts.

3. The POS system described in claim 2, wherein:
the terminal includes a POS application, and the controller of the terminal executes a process of switching between the POS application and the payment application.

4. The POS system described in claim 3, wherein:
the controller of the terminal sends a print command generated by the POS application to the control device after completing processing by the payment application; and
the print mechanism prints a receipt based on the print command.

5. The POS system described in claim 4, wherein:
the control device has a first communicator that sends the result of processing by the payment application to the electronic payment server, and a second communicator that sends the process result of the electronic payment server to the payment application.

6. The POS system described in claim 5, wherein:
the controller of the terminal receives a payment completion report from the electronic payment server, ends processing by the payment application, and switches from the payment application to the POS application.

7. The POS system described in claim 1, wherein:
the terminal includes a POS application; and
the POS system has plural control devices including
a first control device that receives and controls operation based on transaction process data processed by the POS application, and
a second control device that receives and controls operation based on payment process data output by the payment application; and
the device is connected to the second control device.

8. The POS system described in claim 7, wherein:
the second control device has a communicator that communicates with the electronic payment server, and executes a payment transaction with the electronic payment server based on the payment process data received from the terminal and the data input from the device.

9. The POS system described in claim 8, wherein:
the data input from the device is credit information or e-money information; and
the device has a reader to read the credit information or e-money information.

10. The POS system described in claim 9, wherein:
the second control device sends the payment process data with the credit information or e-money information to the electronic payment server.

11. The POS system described in claim 10, wherein
the communicator of the second control device receives the result of the payment transaction on the electronic payment server, and sends the received result of the payment transaction to the terminal.

12. A control method of a POS system, comprising:
reading data from electronic payment media by a device;
inputting data read by the device to a control device;
connecting an electronic payment server to the control device through a network:
connecting by a terminal to the control device and connecting by the terminal to the electronic payment server via the control device;
executing, on the terminal, an electronic payment process by the a payment application on the terminal based on data input to the control device;
sending electronic payment information generated by the payment application and the data input from the device to the electronic payment server; and sending a payment result acquired from the electronic payment server to the terminal.

13. The control method of a POS system described in claim 12, wherein:

the terminal has a POS application, and the POS system has a first control device and a second control device connected to the device;

the control method including sending transaction process data processed by the POS application of the terminal to the first control device; and sending payment process data output by the payment application on the terminal to the second control device.

14. A printer that connects to a device, a terminal, and an electronic payment server, the printer comprising:

a print mechanism configured to print based on print data received from the terminal;

an acquiring component configured to acquire data that the device reads from electronic payment media;

a first communicator configured to:
connect to the terminal and the electronic payment server such that the terminal connects to the electronic payment server via the first communicator, and send to the electronic payment server electronic payment information received from the terminal and data input from the device; and a second communicator configured to send a payment result received from the electronic payment server to the terminal.

\* \* \* \* \*